United States Patent
Buchsteiner et al.

(10) Patent No.: US 6,550,958 B2
(45) Date of Patent: Apr. 22, 2003

(54) DOMESTIC KITCHEN APPLIANCE WITH TRANSMISSION UNIT

(75) Inventors: Alois Jochen Buchsteiner, Klagenfurt (AT); Merowech Eckel, Klagenfurt (AT); Bernhard Rattenberger, Klagenfurt (AT); Arno Zwenig, Villach (AT)

(73) Assignee: Koninklijke Philips Electronics N.V., Einhoven (NL)

( * ) Notice: Subject to any disclaimer, the term of this patent is extended or adjusted under 35 U.S.C. 154(b) by 97 days.

(21) Appl. No.: 09/804,015

(22) Filed: Mar. 12, 2001

(65) Prior Publication Data

US 2001/0040838 A1 Nov. 15, 2001

(30) Foreign Application Priority Data

Mar. 15, 2000 (EP) ............................................. 00200933

(51) Int. Cl.⁷ ................................................. B01F 7/30
(52) U.S. Cl. ...................... 366/292; 366/297; 366/299; 366/300; 99/348; D7/378
(58) Field of Search ......................... 366/65, 244, 288, 366/292, 297, 299, 300; D7/378; 99/348

(56) References Cited

U.S. PATENT DOCUMENTS

| 3,450,390 A | * | 6/1969 | Nauta |
| 3,785,621 A | * | 1/1974 | Hoskins |
| 6,035,771 A | * | 3/2000 | Conran et al. ................ 99/348 |
| 6,227,697 B1 | * | 5/2001 | Stahl ........................... 366/288 |

FOREIGN PATENT DOCUMENTS

| DE | 4033020 A1 | 4/1992 |
| FR | 1477824 | 4/1967 |
| GB | 2014865 A | 2/1979 |

* cited by examiner

Primary Examiner—Joseph W. Drodge
(74) Attorney, Agent, or Firm—Ernestine C. Bartlett

(57) ABSTRACT

A domestic kitchen appliance (1) comprises a container (2) with a central axis (3), a transmission frame (4) positionable on the container (2) and carries a drive element (5), a carrier element (6) which is rotatably journaled relative to the frame (4) about the central axis (3), and at least two coupling elements (7,8) which are rotatably journaled relative to the carrier element (6) about individual axes of rotation (17, 18), a transmission unit (9) carried by the transmission frame (4) for transmitting a rotation of the drive element (5) to a rotation of the carrier element (6) about the central axis (3) and rotations of the coupling elements (7,8) about their axes of rotation (17, 18), a drive unit (10) for driving the drive element (5), and at least two tools (27, 28) couplable to the coupling elements (7, 8). In the domestic kitchen appliance (1) in its assembled condition, the coupling elements (7, 8) are positioned on the carrier element (6) at different distances (a, b) from the central axis (3). Thus, one tool processes the substance present near a center part of the container (2), and the other tool processes the substance present in the vicinity of a wall (22) of the container (2). This benefits the processing of the entire substance present in the container (2), which improves the overall processing results, while a relatively simple construction of the appliance is achieved.

20 Claims, 2 Drawing Sheets

DOMESTIC KITCHEN APPLIANCE WITH TRANSMISSION UNIT

Figure 1:
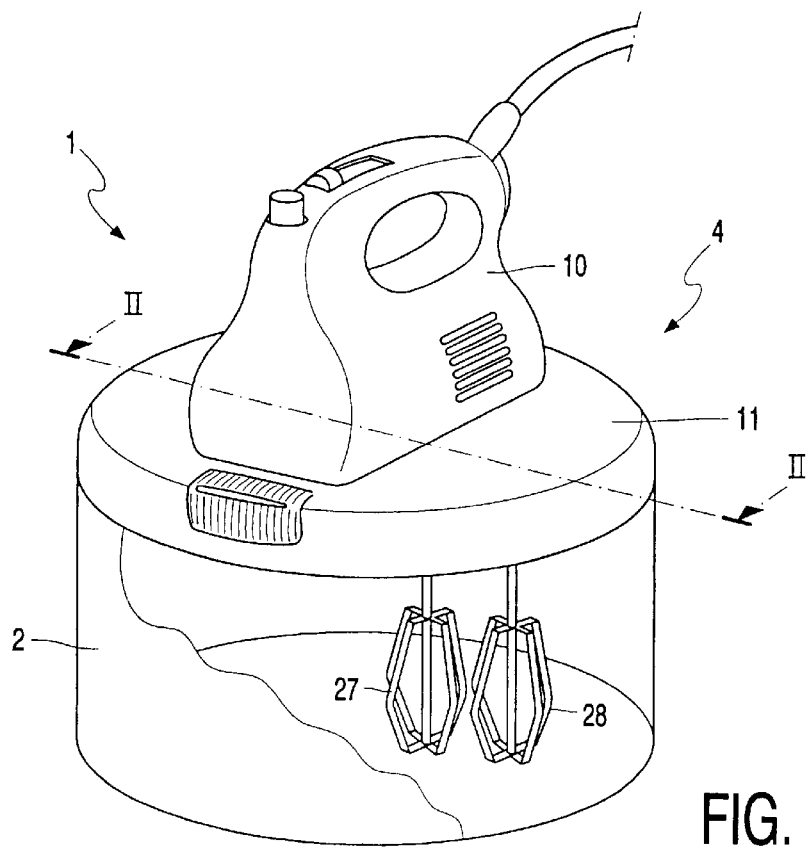

The invention relates to a domestic kitchen appliance comprising a container with a central axis, a transmission frame positionable on the container and which carries a drive element, a carrier element which is rotatably journaled relative to the frame about the central axis, and at least two coupling elements which are rotatably journaled relative to the carrier element about individual axes of rotation, a transmission unit carried by the transmission frame for transmitting a rotation of the drive element to a rotation of the carrier element about the central axis and a rotation of the coupling elements about their respective axes of rotation, a drive unit for driving the drive element, and at least two tools couplable to the coupling elements.

The invention further relates to a lid suitable for use in a domestic kitchen appliance according to the invention.

The invention further relates to a combination of a container and a lid suitable for use in a domestic kitchen appliance according to the invention.

A domestic kitchen appliance of the type defined in the opening paragraph is known from DE 4033020 A1.

This known domestic kitchen appliance comprises a container with a central axis and a transmission frame positionable on the container. The transmission frame carries a drive element, here formed by a shaft, and a carrier element which is rotatably journaled relative to the transmission frame about the central axis. The frame in the known appliance further carries two coupling elements which are rotatably journaled relative to the carrier element about individual axes of rotation. The coupling elements are positioned on the carrier element on opposite sides of the central axis of the container. The known appliance further comprises a transmission unit, here formed by a planetary gearing, carried by the transmission frame for transmitting a rotation of the shaft to a rotation of the carrier element about the central axis and a rotation of the coupling elements about their axes of rotation. The known appliance further comprises a drive unit for driving the shaft, formed by a handmixer which can be positioned on the transmission frame, and two tools couplable to the coupling elements for processing a substance present in the container. The tools in the known appliance are of a specific structure with relatively large dimensions so as to fit within the container which also has a specific structure adapted to the structure of the tools, said container being provided with a column extending from the bottom of the container upwards along its central axis. This specific structure of tools and container is aimed at an appropriate processing of as much of the substance in the container as possible. A disadvantage of the known domestic kitchen appliance is that these structures are relatively complex and accordingly difficult to manufacture.

It is an object of the invention to provide an improved domestic kitchen appliance with a relatively simple construction that offers at least comparable processing results.

To achieve this object, a domestic kitchen appliance according to the invention is characterized in that, with the domestic kitchen appliance in its assembled condition, the coupling elements are positioned at different distances from the central axis on the carrier element. A first tool is couplable to a first coupling element which is present on the carrier element at a first distance relatively close to the central axis. In this way, during operation of the kitchen appliance, the first tool travels in an orbital path around the central axis relatively close to that axis. Simultaneously, the first tool rotates about its individual axis of rotation relative to the carrier element. A second tool is couplable to a second coupling element which is present on the carrier element at a distance relatively further away from the central axis. In this way, during operation, the second tool travels in an orbital path around the central axis relatively further away from that axis. Meanwhile, the second tool also rotates about its individual axis of rotation relative to the carrier element. Thus, one tool processes the substance present near a center part of the container, and the other tool processes the substance present in the vicinity of a wall of the container. This benefits the processing of the entire substance present in the container, which improves the overall processing results, while a relatively simple construction of the appliance is achieved. The tools may, for example, constitute whisks, beaters or dough hooks, depending on the substance to be processed.

An embodiment of a domestic kitchen appliance according to the invention is characterized in that the carrier element is circular, and said coupling elements are both positioned within a single quadrant of the carrier element. When coupled to the coupling elements, the tools are thus present on the circular carrier element in the same lateral region relative to the central axis. In that lateral region, the tools cooperate closely and process the substance present near the center part of the container and the substance present close to the wall of the container by rotating relative to the carrier element each about its individual axis of rotation. By simultaneously rotating together with the carrier element about the central axis, the tools thus thoroughly process the substance present both in the center and close to the wall of the entire container.

A further embodiment of a domestic kitchen appliance according to the invention is characterized in that the coupling elements are both positioned on the same radius. Thus, an optimal cooperation is provided between the tools for thoroughly processing the substance present near the center part of the container and the substance present close to the wall of the container.

A further embodiment of a domestic kitchen appliance according to the invention is characterized in that the transmission frame comprises a lid for covering the container. In this way the transmission frame performs a double function. Firstly, it covers the container, thus preventing sputtering of substance from the container during operation. Secondly, the transmission unit is covered so that it cannot be touched by a user during operation, which benefits the safety of the appliance.

It is advantageous if the carrier element forms a wall of the lid, which wall faces the container in assembled condition. In this way the carrier element covers the transmission unit against contact with the substance present inside the container. Hence it is counteracted that the transmission unit becomes polluted, which could hamper the functioning of the transmission unit.

A further embodiment of a domestic kitchen appliance according to the invention is characterized in that the transmission unit comprises a planetary gearing, said planetary gearing comprising a first gear coaxially connected to the drive element, a second gear coaxially connected to a first coupling element, a third gear coaxially connected to a second coupling element, a fourth gear coaxially connected to the transmission frame, a first intermediate gear in engagement with the first gear, the second gear and the fourth gear and rotatably journaled relative to the carrier element, and a second intermediate gear in engagement with the first intermediate gear and the third gear and rotatably journaled relative to the carrier element. This planetary gearing has a relatively simple structure because the first intermediate gear provides rotation of the carrier element as well as rotation of the tools coupled with the coupling elements. On the one hand, this benefits a simple construction of the appliance, while on the other hand the possibility of positioning the coupling elements at different distances from the central axis on the carrier element is achieved in a simple manner.

It is furthermore advantageous if the container is provided with a filling shaft which projects outside the perimeter of the lid. When the container is covered with the lid during operation, there is no possibility of adding additional ingredients through the lid to the substance to be processed because of the rotation of the carrier element in the lid. The filling shaft projects beyond the perimeter of the lid and thus provides the possibility of adding ingredients without interfering with the rotating carrier element.

It is noted that GB 2014865 A shows a domestic kitchen appliance with a container with a central axis and a carrier element provided with coupling elements positioned at different distances from the central axis, a transmission unit transmitting a rotation of a drive element to a rotation of the coupling elements about their individual axes of rotation, and two tools couplable to the coupling elements. This appliance is of a different type from the appliance according to the invention because in this appliance the carrier element is immovably fixed to the transmission frame. No rotation of the carrier element relative to the transmission frame about the central axis is provided. It is the container which is rotated relative to the carrier element about the central axis during operation .

Figure 2:
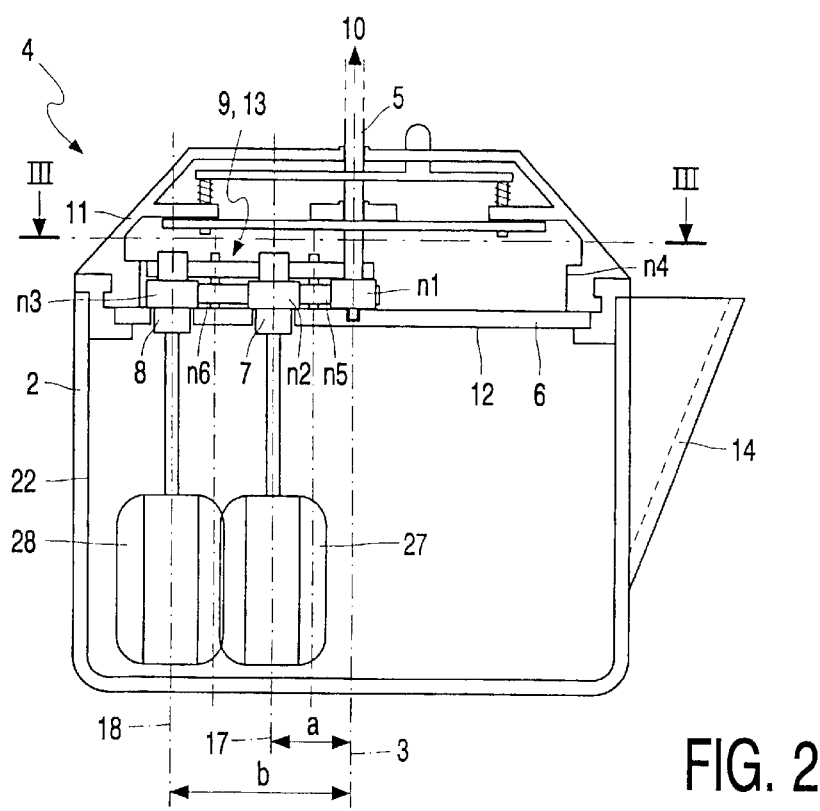
Figure 3:
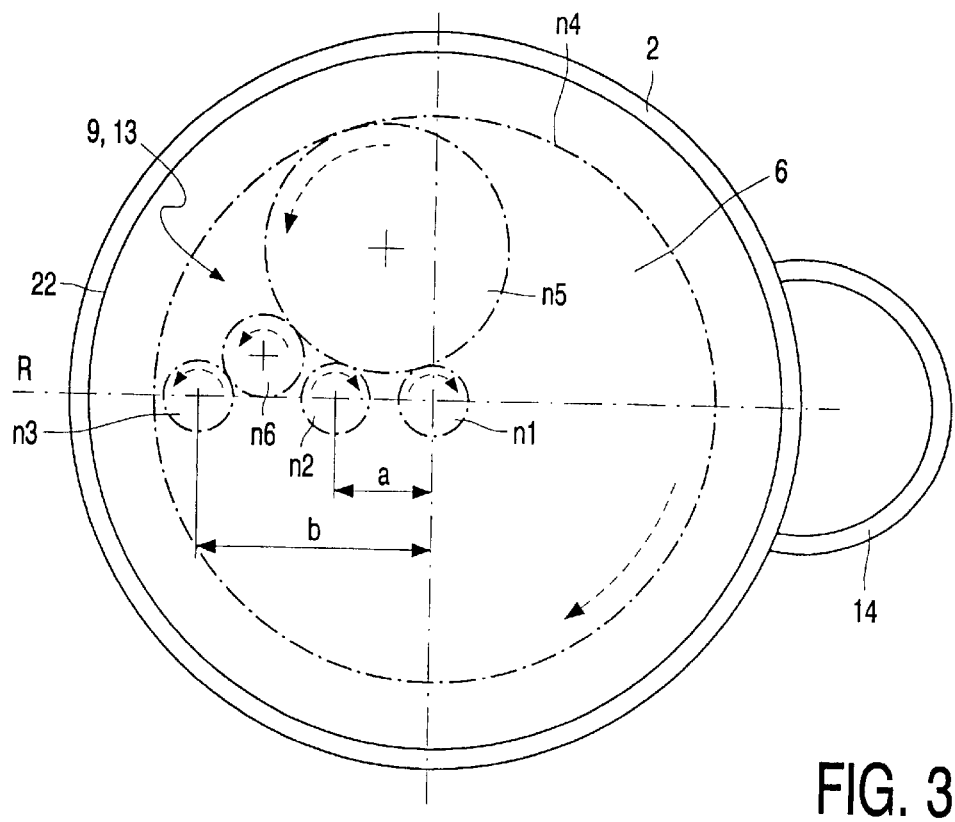
Figure 4:
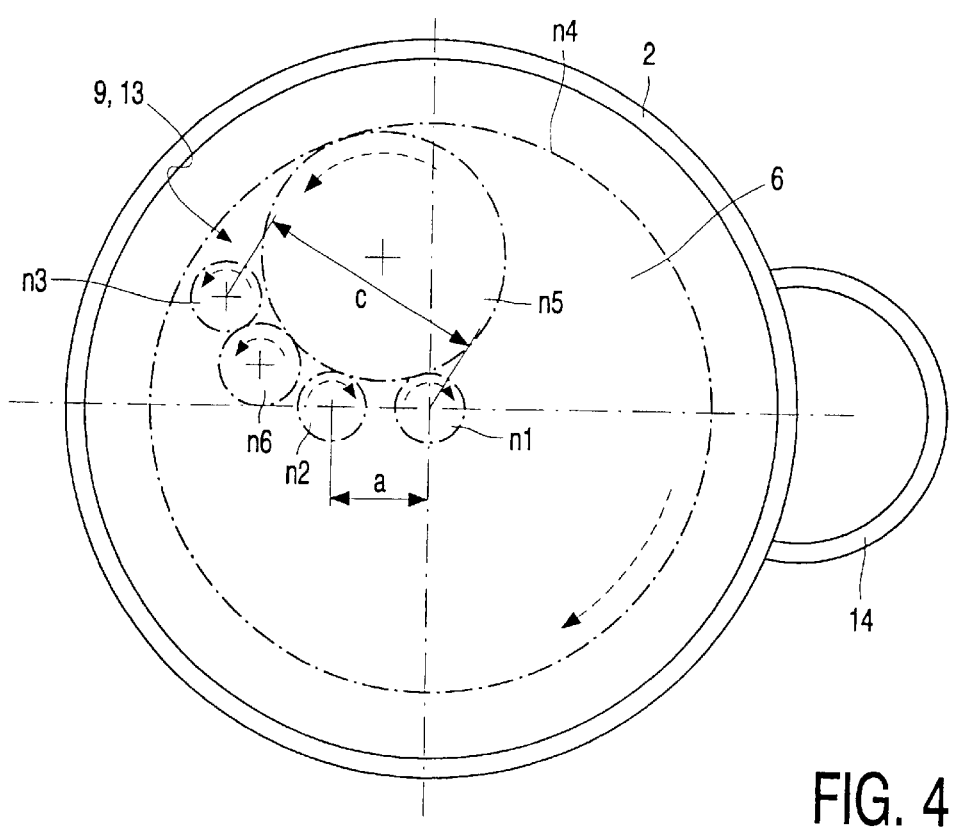

The invention will now be described in more detail with reference to the drawings, in which FIG. 1 is a perspective view of a first embodiment of a domestic kitchen appliance according to the invention, partly broken away, FIG. 2 is a diagrammatic view of a cross-section of a container with a lid of the domestic kitchen appliance taken on the line II—II in FIG. 1, FIG. 3 is a diagrammatic view of a cross-section of the lid of the domestic kitchen appliance taken on the line III—III in FIG. 2, and FIG. 4 is a diagrammatic view of a cross-section of a lid of a second embodiment of a domestic kitchen appliance according to the invention.

FIG. 1 shows a first embodiment of a domestic kitchen appliance 1 according to the invention, comprising a container 2 for containing a substance to be processed by a first and a second tool 27, 28, and a transmission frame 4 positioned on the container 2, here formed by a lid 11. The tools 27, 28 in this embodiment are formed by whisks for processing the substance in the container. It is noted, however, that different tools are applicable in this kitchen appliance, dependent on the substance to be processed, for example whipping cream, cake mixture, or dough. Thus any other type of tool, such as beaters or dough hooks, may be used instead of wisks. The appliance further comprises a driving unit 10 for driving a drive element 5 (see FIG. 2), which driving unit 10 in this embodiment is formed by a handmixer which can be positioned on and coupled to the lid 11. This is advantageous because this handmixer can also be individually utilized in other applications. However, any other type of driving unit may also be used, for example a driving unit which is fixed to the transmission frame 4.

As is shown in FIG. 2, the transmission frame 4 carries the drive element 5, here formed by a central shaft which is driven by the driving unit 10. It further carries a carrier element 6 which is rotatably journaled relative to the transmission frame 4 about a central axis 3 of the container 2, and at least two coupling elements 7, 8 which are rotatably journaled relative to the carrier element 6 about individual axes of rotation 17, 18. The transmission frame 4 further carries a transmission unit 9 for transmitting a rotation of the drive element 5 to a rotation of the carrier element 6 about the central axis 3 and rotations of the coupling elements 7, 8 about their axes of rotation 17, 18. The coupling elements 7, 8 are positioned on the carrier element 6 at different distances a, b from the central axis 3. A first coupling element 7 is positioned at the distance a from the central axis 3, which is relatively close to the central axis 3. The first tool 27 is couplable to this first coupling element 7, so that during operation the first tool 27 travels in an orbital path around the central axis 3 relatively close to the central axis 3 as a result of the rotation of the carrier element 6. The first tool 27 simultaneously rotates relative to the carrier element 6 about its individual axis 17. Thus, an amount of substance which is as large as possible and is present near a center part of the container 2 can be thoroughly processed by the first tool 27. A second coupling element 8 is positioned at the distance b from the central axis 3, which is relatively further away from the central axis 3. The second tool 28 is couplable to this second coupling element 8, so that during operation the second tool 28 travels in an orbital path around the central axis 3 relatively further away from the central axis 3 as a result of the rotation of the carrier element 6. The second tool 28 simultaneously rotates relative to the carrier element 6 about its individual axis 18. Thus, an amount of substance which is as large as possible and is present in the vicinity of a wall 22 of the container 2 can be thoroughly processed by the second tool 28. The processing of the entire amount of substance present in the container 2 is improved as a result of the two tools 27, 28 cooperating while simultaneously rotating relative to the carrier element 6 about their individual axes 17, 18, and rotating together with the carrier element 6 relative to the transmission frame 4 about the central axis 3. This improved processing is achieved with a relatively simple construction of the appliance. In this embodiment, the tools have a rotation speed of 1000 rpm and the carrier element has a rotation speed of 80 rpm. It is noted however that these rpm values may also be chosen differently.

It is further shown in FIG. 3 that the carrier element 6 is circular and that the coupling elements 7, 8 are both positioned within a single quadrant of the carrier element 6. When coupled to the coupling elements 7, 8 the tools 27, 28 are thus present on the circular carrier element 6 in the same lateral region relative to the central axis 3. In this lateral region the tools 27, 28 cooperate closely during operation and thoroughly process the substance present near the center part of the container 2 and the substance present close to the wall 22 of the container 2. Because of the rotation of the tools 27, 28 together with the carrier element 6 about the central axis, the tools 27, 28 together process the substance present in the entire container 2, both in the center area, and close to the wall 22 thereof. This benefits the processing results.

As can further be seen in FIG. 2, the transmission frame 4 comprises a lid 11 which covers the container 2. Thus the substance present in the container 2 cannot sputter into the surrounding area of the appliance during operation and a clean process is achieved. It is further evident from the Figure that the transmission unit 9 is enclosed by the lid 11. Thus the transmission unit 9 with its rotating parts cannot be touched by a user during operation, which benefits the safety of the appliance. Furthermore it can be seen in FIG. 2, that the carrier element 6 forms a wall 12 of the lid 11, which wall faces the container 2 in assembled condition. The carrier element 6 thus covers the transmission unit 9, with only the tools 27, 28 passing through the carrier element 6 into the interior of the container 2, which prevents substance from the container from sputtering against the transmission unit 9 and soiling it during operation. The carrier element 6 forming the wall 12 can easily be cleaned by the user when the appliance is inoperative.

In FIGS. 2, 3 and 4 it is further shown that the container 2 is provided with a filling shaft 14 projecting outside the perimeter of the lid 11. When the container is covered with the lid 11 during operation, there is no possibility of adding additional ingredients through the lid 11 to the substance to be processed because of the rotation of the carrier element 6 in the lid 11. The filling shaft 14 protruding at the outside of the lid provides the possibility of adding ingredients to the substance in the container 2 without interfering with the rotating carrier element 6.

FIG. 3 further shows that the transmission unit 9 comprises a planetary gearing 13. This planetary gearing 13 comprises a first gear n1 coaxially connected to the drive element 5, a second gear n2 coaxially connected to the first coupling element 7, a third gear n3 coaxially connected to the second coupling element 8, a fourth gear n4 coaxially connected to the carrier element 6, a first intermediate gear n5 in engagement with the first gear n1, the second gear n2 and the fourth gear n4, and a second intermediate gear n6 in engagement with the first intermediate gear n5 and the third gear n3. The second and the third gear n2 and n3 are positioned concentrically relative to the individual axes of rotation 17, 18 of the coupling elements 7, 8. The first intermediate gear n5 is in engagement with the fourth gear n4, which is provided with a series of inner teeth and is provided on the inner perimeter of the lid 11. The dotted arrows shown in the gears and the carrier element 6 indicate their respective directions of rotation. The second intermediate gear n6 is provided for driving the third gear n3 in a direction opposed to the direction of the second gear n2, whereby the tools 27, 28 coupled to the coupling elements 7, 8 are rotated in mutually opposed directions about their individual axes 17, 18 during operation. This benefits the processing results. Since the first intermediate gear n5 in the transmission unit 9 is designed for providing rotation of both the carrier element 6 and the tool 27, as well as the tool 28 by being in engagement with the intermediate gear n6, a relatively simple construction is achieved which further provides the possibility of positioning the coupling elements 27, 28 on the carrier element 6 at different distances from the central axis 3.

In this embodiment, the coupling elements 7, 8 are present on the same radius R shown in FIG. 3 as a result of the position of the second and the third gear n2 and n3 on said radius R. Thus, when the tools 27, 28 are coupled to the coupling elements 7, 8, an optimal cooperation is provided between the tools 27, 28 for thoroughly processing the substance present near the center part of the container 2 and the substance present close to the wall of the container 2.

As can be seen in FIG. 4, which shows a second embodiment of a domestic kitchen appliance according to the invention, it is also possible with such a planetary gearing to position the coupling elements 7, 8 at different distances a and c, respectively, from the central axis 3 and on different radiuses. Thus, the use of such a planetary gearing creates a large degree of freedom to adapt the positions of the tools 27, 28 relative to the central axis 3.

It is noted that, with a domestic kitchen appliance 1 as described above, the processing of the entire substance present in the container 2 is improved by the two tools 27, 28 processing both the substance present near a center part of the container and the substance present in the vicinity of a wall of the container, while simultaneously rotating relative to the carrier element 6 about their individual axes 17, 18 and rotating along with the carrier element 6 relative to the transmission frame 4 about the central axis 3. Besides, the processing operation can be carried out in a clean and efficient manner by the user with this domestic kitchen appliance. The appliance can be safely operated and easily cleaned because of the enclosed arrangement of the rotating parts.

What is claimed is:

1. A domestic kitchen appliance (1) comprising:
    a container (2) having a central axis (3),
    a transmission frame (4) arranged for positioning on the container (2) and carrying
        a drive element (5),
        a carrier element (6) which is rotatably journaled relative to the frame (4) about the central axis (3), and
        at least two coupling elements (7, 8) which are rotatably journaled relative to the carrier element (6) about individual axes of rotation (17, 18),
    a transmission unit (9) carried by the transmission frame (4) for transmitting a rotation of the drive element (5) to a rotation of the carrier element (6) about the central axis (3), and for transmitting the rotation of the drive element (5) to a rotation of the coupling elements (7, 8) about their respective axes of rotation (17, 18),
    a drive unit (10) for driving the drive element (5), and
    at least two tools (27, 28) couplable to the coupling elements (7, 8),
    characterized in that the coupling elements (7, 8) are positioned at different distances (a, b) from the central axis (3) on the carrier element (6),
    whereby each coupling element and its associated tool are positioned within a single quadrant of the carrier element and following a mutually exclusive circular path about the central axis.

2. A domestic kitchen appliance as claimed in claim 1, characterized in that the carrier element (6) is circular, and said carrier element (6) is positioned so as to protect said transmission unit (9) from contact with material in the container (1).

3. A domestic kitchen appliance as claimed in claim 2, characterized in that, with respect to the central axis (3), the coupling elements (7, 8) are both positioned on a same radial line (R).

4. A domestic kitchen appliance as claimed in claim 2, characterized in that, with respect to the central axis (3), the coupling elements (7, 8) are positioned on mutually different radial lines.

5. A domestic kitchen appliance as claimed in claim 1, characterized in that the transmission frame (4) comprises a lid (11) for covering the container (2).

6. A domestic kitchen appliance as claimed in claim 5, characterized in that the carrier element (6) forms a wall (12) of the lid (11), which wall faces the container (2) in the assembled condition.

7. A domestic kitchen appliance as claimed in claim 5, characterized in that the container (2) is provided with a filling shaft (14) which projects outside the perimeter of the lid (11).

8. The combination as claimed in claim 5, characterized in that said carrier element (6) forms a wall of the lid (11), said wall being arranged to face the container (2) when the lid is assembled to the container, characterized in that said respective axes of rotation (17, 18) are substantially parallel to each other and to the central axis (3).

9. The combination as claimed in claim 5, characterized in that said carrier element (6) is circular, and said coupling elements (7, 8) are both positioned within a single quadrant of the carrier element (6).

10. A domestic kitchen appliance as claimed in claim 1, characterized in that the transmission unit (9) comprises a planetary gearing (13), said planetary gearing (13) comprising a first gear (n1) coaxially connected to the drive element (5), a second gear (n2) coaxially connected to a first coupling element (7), a third gear (n3) coaxially connected to a second coupling element (8), a fourth gear (n4) coaxially connected to the transmission frame (4), a first intermediate gear (n5) in engagement with the first gear (n1), the second gear (n2) and the fourth gear (n4), and rotatably journaled relative to the carrier element (6), and a second intermediate gear (n6) in engagement with the first intermediate gear (n5) and the third gear (n3) and rotatably journaled relative to the carrier element (6).

11. A domestic kitchen appliance as claimed in claim 1, characterized in that said respective axes of rotation (17, 18) are substantially parallel to each other and to the central axis (3).

12. A domestic kitchen appliance, as claimed in claim 1, wherein the transmission unit comprises gearing for enabling the tools to be rotated in mutually opposed directions about their respective axes of rotation during operation.

13. A lid for a domestic kitchen container, said lid having a central axis (3), and comprising:

a transmission frame (4) carrying a drive element (5) arranged for engagement by a removable driving device, a carrier element (6) which is rotatably journaled relative to the frame (4) about the central axis (3), and at least two coupling elements (7, 8) which are rotatably journaled relative to the carrier element (6) about individual axes of rotation (17, 18), each coupling element being arranged for engagement by a respective removable tool, a transmission unit (9) carried by the transmission frame (4) for transmitting a rotation of the drive element (5) to a rotation of the carrier element (6) about the central axis (3), and for transmitting the rotation of the drive element (5) to a rotation of the coupling elements (7, 8) about their respective axes of rotation (17, 18), and at least two tools (27, 28) couplable to the coupling elements (7, 8), characterized in that the coupling elements (7, 8) are positioned at different distances (a, b) from the central axis (3) on the carrier element (6), whereby each coupling element are positioned within a single quadrant of the carrier element and following a mutually exclusive circular path about the central axis when the drive element is driven.

14. A lid for a domestic kitchen container as claimed in claim 13, characterized in that said respective axes of rotation (17, 18) are substantially parallel to each other and to the central axis (3).

15. A lid for a domestic kitchen container as claimed in claim 13, characterized in that said carrier element (6) is circular, and said carrier element (6) is positioned so as to protect said transmission unit (9) from contact with material in the container (1).

16. A lid for a domestic kitchen container as claimed in claim 15, characterized in that, with respect to the central axis (3), the coupling elements (7, 8) are both positioned on a same radial line (R).

17. A lid for a domestic kitchen appliance as claimed in claim 15, characterized in that, with respect to the central axis (3), the coupling elements (7, 8) are positioned on mutually different radial lines.

18. A lid for a domestic kitchen container as claimed in claim 13, characterized in that said carrier element (6) forms a wall of the lid, said wall being arranged to face the container when the lid is assembled to the container.

19. A lid for a domestic kitchen container as claimed in claim 13, characterized in that the transmission unit comprises a planetary gearing (13), said planetary gearing comprising:

a first gear (n1) coaxially connected to the drive element (5), a second gear (n2) coaxially connected to a first of said coupling elements (7), a third gear (n3) coaxially connected to a second of said coupling elements (8), a fourth gear (n4) coaxially connected to the transmission frame (4), a first intermediate gear (n5) rotatably journaled relative to the carrier element (6), and engaging the first gear (n1), the second gear (n2) and the fourth gear (n4), and a second intermediate gear (n6) rotatably journaled relative to the carrier element (6), and engaging the first intermediate gear (n5) and the third gear (n3).

20. A lid for a domestic kitchen container, as claimed in claim 13, wherein the transmission unit comprises gearing for enabling the tools to be rotated in mutually opposed directions about their respective axes of rotation during operation.

* * * * *